US006981049B2

(12) United States Patent
Buck et al.

(10) Patent No.: US 6,981,049 B2
(45) Date of Patent: Dec. 27, 2005

(54) SYSTEM AND METHOD FOR PROCESSING DATA THROUGH A NETWORK FIREWALL

(75) Inventors: Karl Richard Buck, Austin, TX (US); Jose Ramon Chavez, Jr., Tucson, AZ (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 09/999,140

(22) Filed: Nov. 29, 2001

(65) Prior Publication Data

US 2003/0115249 A1    Jun. 19, 2003

(51) Int. Cl.$^7$ ............................................. G06F 15/16
(52) U.S. Cl. ...................... 709/229; 709/202; 709/217; 709/227
(58) Field of Search ............................... 709/201, 207, 709/227, 229, 202, 217

(56) References Cited

U.S. PATENT DOCUMENTS

| | | | | |
|---|---|---|---|---|
| 5,450,593 A | * | 9/1995 | Howell et al. ............... 713/200 |
| 5,467,467 A | * | 11/1995 | Ozawa ......................... 714/55 |
| 5,699,513 A | * | 12/1997 | Feigen et al. ................ 713/201 |
| 5,826,029 A | * | 10/1998 | Gore et al. .................. 709/227 |
| 5,928,333 A | | 7/1999 | Landfield et al. ............ 709/245 |
| 6,134,582 A | | 10/2000 | Kennedy ..................... 709/206 |
| 6,631,417 B1 | * | 10/2003 | Balabine ..................... 709/229 |
| 6,816,910 B1 | * | 11/2004 | Ricciulli ..................... 709/237 |
| 2002/0023143 A1 | * | 2/2002 | Stephenson et al. ........ 709/218 |
| 2002/0038371 A1 | * | 3/2002 | Spacey ....................... 709/227 |

* cited by examiner

*Primary Examiner*—Rupal Dharia
*Assistant Examiner*—Nicholas R. Taylor
(74) *Attorney, Agent, or Firm*—Van Leeuwen & Van Leeuwen; David A. Mims, Jr.

(57) ABSTRACT

A system and method for processing data through a network firewall is presented. A more secure computer system initiates connections to one or more less secure computer systems. The more secure computer system and less secure computer system are separated by a firewall. The more secure computer system queries each less secure computer system periodically to see if there is event data or requests that the more secure computer system should respond to. The less secure computer systems store event data and requests from clients in a storage location until queried by the more secure computer system. When queried, the less secure computer system sends the event data or request information to the more secure computer system through the firewall. The more secure computer system either sends a response to the less secure computer system or sends the event data to an event console for a system administrator to analyze.

18 Claims, 6 Drawing Sheets

SYSTEM AND METHOD FOR PROCESSING DATA THROUGH A NETWORK FIREWALL

BACKGROUND OF THE INVENTION

1. Technical Field

The present invention relates in general to a system and method for transferring information between computer systems that have a different security levels. More particularly, the present invention relates to a system and method for a more secure computer system to initiate an information transfer from a less secure computer system.

2. Description of the Related Art

Data security is a high priority in computer systems. Companies spend millions of dollars to protect confidential information against competitors as well as computer hackers. Computer hackers spend many hours attempting to enter a company's database in order to corrupt the information or sell the information to others. Computer hackers also spend time attempting to gain access to personal computers. High-speed digital cable technology makes it easier for computer hackers to enter another person's personal computer because the personal computer is connected to the network and the computer hacker does not have to guess at a phone number in order to reach the personal computer's modem.

In business networks, a firewall is usually installed between more sensitive information and less sensitive information. The firewall may be installed between the company's database and the outside world. There also may be many intra-company firewalls in order to limit access to confidential information to certain employees. A challenge with existing art is that the less secure computer system initiates connections between the less secure computer system and the more secure computer system. The ability for the less secure computer system to initiate connections may make it easier for a malicious client to initiate a connection and gain access to data stored in the more secure computer system.

What is needed, therefore, is a way for the more secure computer system to initiate connections and retrieve event data and requests from the less secure computer system.

SUMMARY

It has been discovered that data security is increased and access to the more secure computer system is effectively managed by initiating connections from the more secure computer system and having less secure computer systems send event data and requests in response to the connection.

The more secure computer system may support multiple less secure computer systems in a network. The more secure computer system queries each less secure computer system periodically to determine whether there are pending event data or requests to which the more secure computer system should respond. The less secure computer systems store event data and requests from clients in storage locations until queried by the more secure computer system. When queried, the less secure computer system sends the event data or request information to the more secure computer system through a network firewall. In an alternative embodiment, the less secure systems send a signal to the more secure system indicating the existence of pending events or requests.

When the more secure computer system receives event data, such as information about a server malfunctioning, the more secure computer system forwards the event data to the appropriate event console. The event console informs a system administrator of the problem.

When the more secure computer system receives a request for information, the more secure computer system retrieves the information and sends it to the appropriate less secure computer system for processing. The data may be appropriately encrypted using a public key/private key encryption technique so that only the intended computer system is able to decipher the information once the information enters the less secure computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
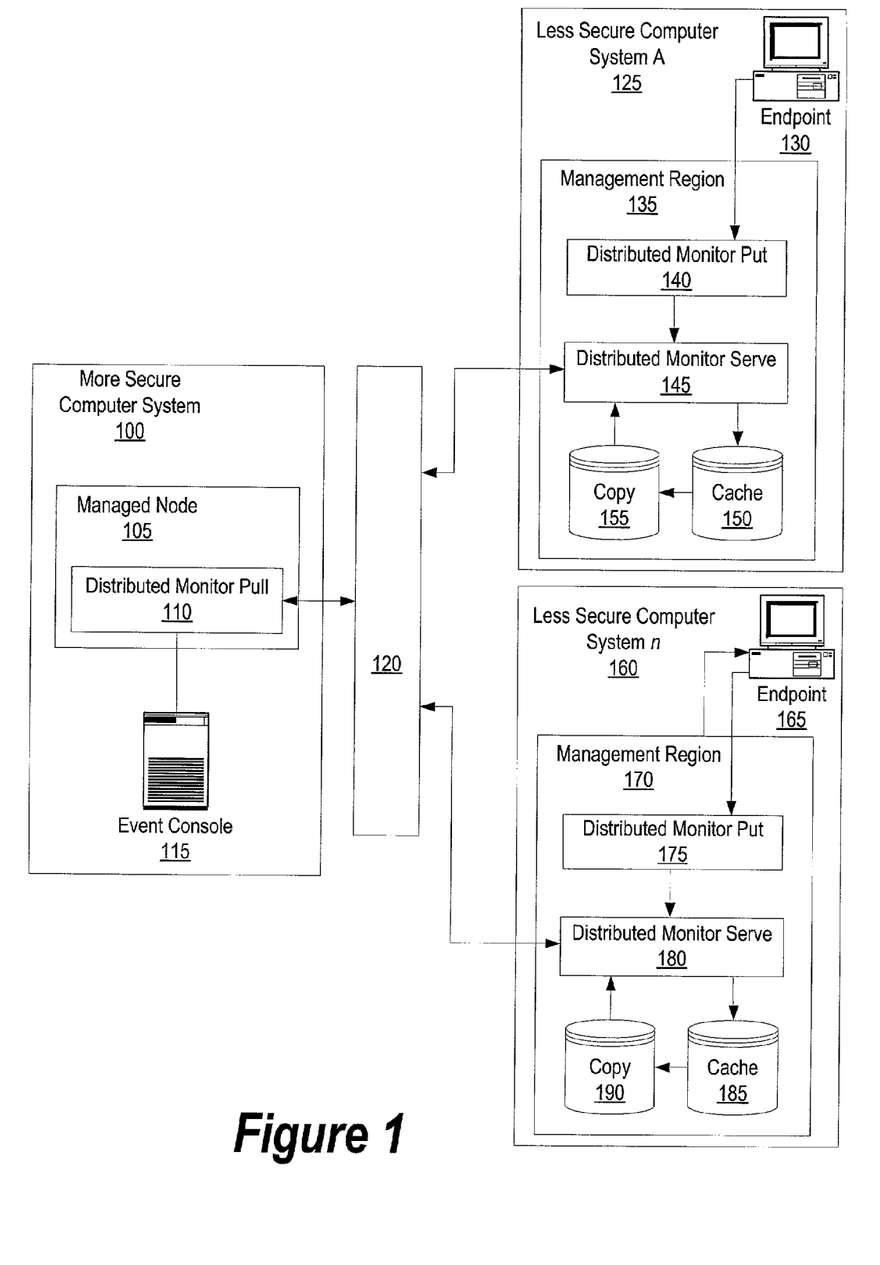
FIG. 1 is a high level diagram of a more secure computer system requesting data from less secure computer systems through a firewall.

FIG. 1 is a high level diagram of a more secure computer system retrieving data from less secure computer systems through a firewall. More secure computer system 100 includes managed node 105 which includes distributed monitor pull 110. Distributed monitor pull 110 queries less secure computer system A 125 and less secure computer system n 160 periodically to check for pending requests or event data to pull through firewall 120. Event data may be system information that is used to inform a system administrator. Pending requests may be requests from clients seeking information that resides on the more secure computer system.

For example, less secure computer system A 125 may have a server malfunction. Endpoint 130 establishes a connection with distributed monitor put 140 which is located within management region 135. Once the connection is established, endpoint 130 formats event data describing the malfunction and sends the event data to distributed monitor put 140. Distributed monitor put 140 establishes a connection with distributed monitor serve 145 and forwards the event data. Distributed monitor serve 145 stores the information in cache 150. Cache 150 may be a non-volatile storage area, such as a computer hard drive.

When distributed monitor pull 110 queries management region 135 for pending request or event information, distributed monitor serve 145 copies data from cache 150 to copy store 155. Data is copied from cache 150 to copy store 155 in order to avoid conflicts with data being written to storage in corresponding to an endpoint 130 request at the same time as data is being read from storage in response to a distributed monitor pull request. The pending request or event information is sent to distributed monitor pull 110 from copy 155. Using the example above, the event data describing the malfunctioning server is sent to event console 115 for analysis by a system administrator.

More secure computer system 100 can retrieve pending events and requests from any number of less secure computer systems. For example, after event or request information is received from management region 135, distributed monitor pull 110 queries management region 170. Management region 170 is within less secure computer system n 160 and receives requests from endpoint 165. Endpoint 165 may request information that is located within more secure computer system 100, such as bank account information. Endpoint 165 sends a request to distributed monitor put 175. Distributed monitor put 175 forwards the request to distributed monitor serve 180 which stores the request in cache 185.

When management region 170 receives a request from distributed monitor pull 110, distributed monitor serve 180 copies the contents from cache 185 to copy 190. The contents of copy 190 are sent to distributed monitor pull 110 through firewall 120. Management node 105 recognizes the request, and sends back a corresponding response to management region 170 through firewall 120. Management region 170 forwards the response to endpoint 165.

Figure 2:
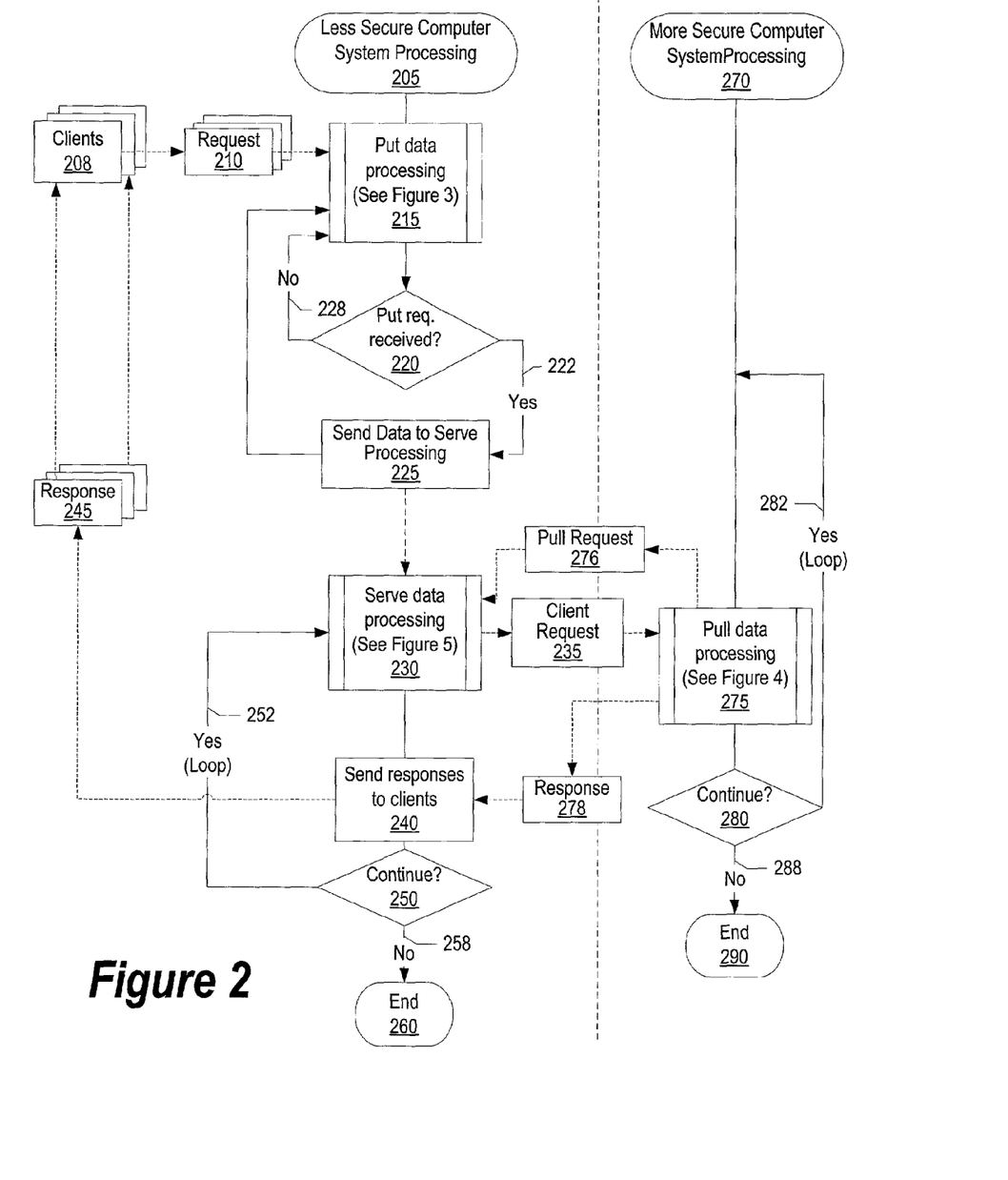
FIG. 2 is flowchart showing client requests requested by a more secure computer system and corresponding responses sent back to the clients.

FIG. 2 is flowchart showing client requests sent to a more secure computer system and corresponding responses sent back to the respective clients. Less secure computer system processing commences at 200, whereupon one or more clients 208 send requests 210 for put data processing (pre-defined process block 215, see FIG. 3 for further details). Each time a request is received, put data processing initiates a put data processing thread to process the request.

A determination is made as to whether request 210 has been received (decision 220). If put request 210 has not been received, decision 220 branches to "No" branch 228 bypassing sending data to serve processing. On the other hand, if put request 210 has been received, decision 220 branches to "Yes" branch 222 whereupon event data and pending requests are sent at step 225 to serve data processing (pre-defined process block 230, see FIG. 5 for further details). After the data is sent to serve data processing, put data processing loops back to process more client requests.

Serve data processing stores data from put data processing until serve data processing receives pull request 276 from pull data processing. Serve data processing sends Client request 235 to more secure computer system 265 in response to pull request 276. Client request 235 includes event data and pending request information. If client request 235 calls for a response, pull data processing sends response 278 in response to client request 278. Response 278 may be encrypted using a public key/private key encryption scheme, or other encryption method, in order to ensure data security between the less secure and more secure computer systems.

Response 278 is formatted, if applicable, and resent as response 245 to the corresponding client that initiated the request. A determination is made as to whether processing continues (decision 250). If processing continues, decision 250 branches to "Yes" branch 252 which loops back to process more requests. This looping continues until processing terminates, at which point decision 250 branches to "No" branch 258 and less secure computer system processing ends at 260.

Figure 4:
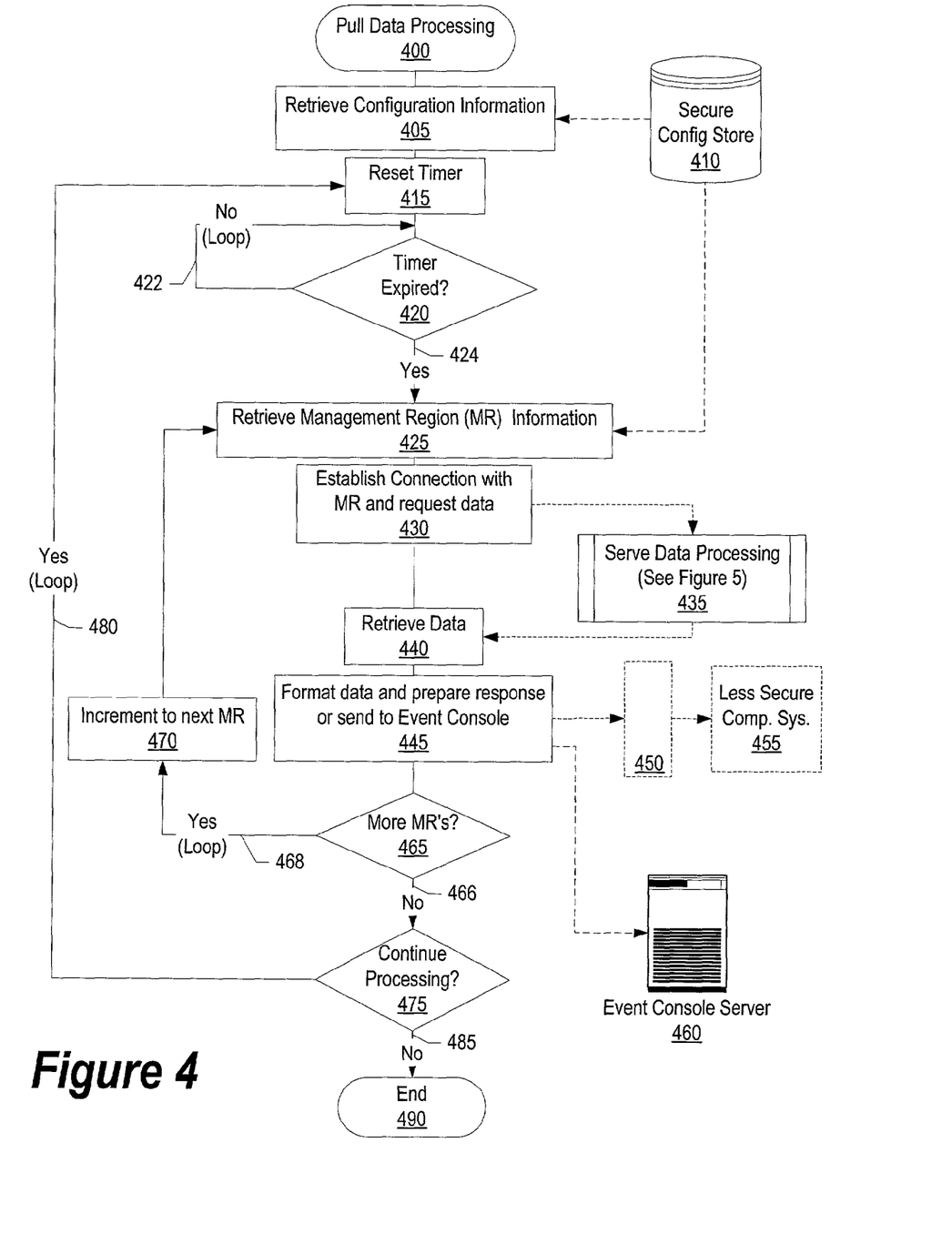
FIG. 4 is a flowchart showing a more secure computer system processing pending requests from a less secure computer system.

More secure computer system processing commences at 270, whereupon pull data processing is initiated (pre-defined process block 275, see FIG. 4 for further details). Pull data processing retrieves client request 235 from the less secure computer system and returns response 278 to less secure computer system 200. For example, if client request 235 requests bank account information, response 278 may include the requested bank account information.

A determination is made as to whether more secure computer system processing continues (decision 280). If processing continues, decision 280 branches to "Yes" branch 282 which loops back to process more requests. This looping continues until processing terminates, at which point decision 280 branches to "No" branch 288 and processing ends at 290.

Figure 3:
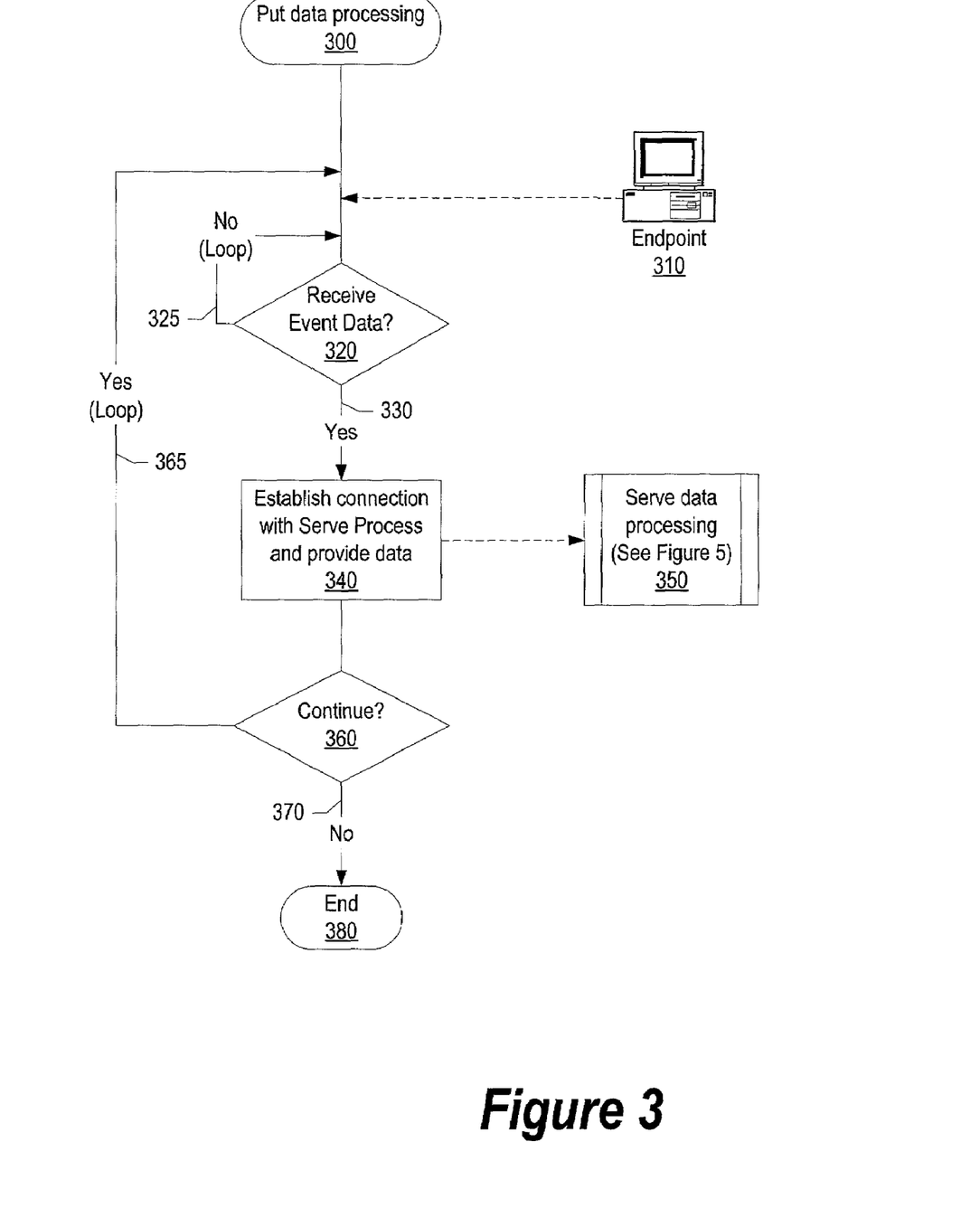
FIG. 3 is a flowchart showing client data being received by a less secure computer system and forwarded to a more secure computer system.

FIG. 3 is a flowchart showing client data being received and forwarded by a less secure computer system to a more secure computer system. Put data processing commences at 300, whereupon a determination is made as to whether a request or event data has been received (decision 320) from endpoint 310. Endpoint 310 may be a client, a server, a router, or another element of a computer system. If a request or event data has not been received, decision 320 branches to "No" branch 325 which loops back to wait for a request or event data from endpoint 310. This looping continues until endpoint 310 sends a request or event data, at which point decision 320 branches to "Yes" branch 330.

Figure 5:
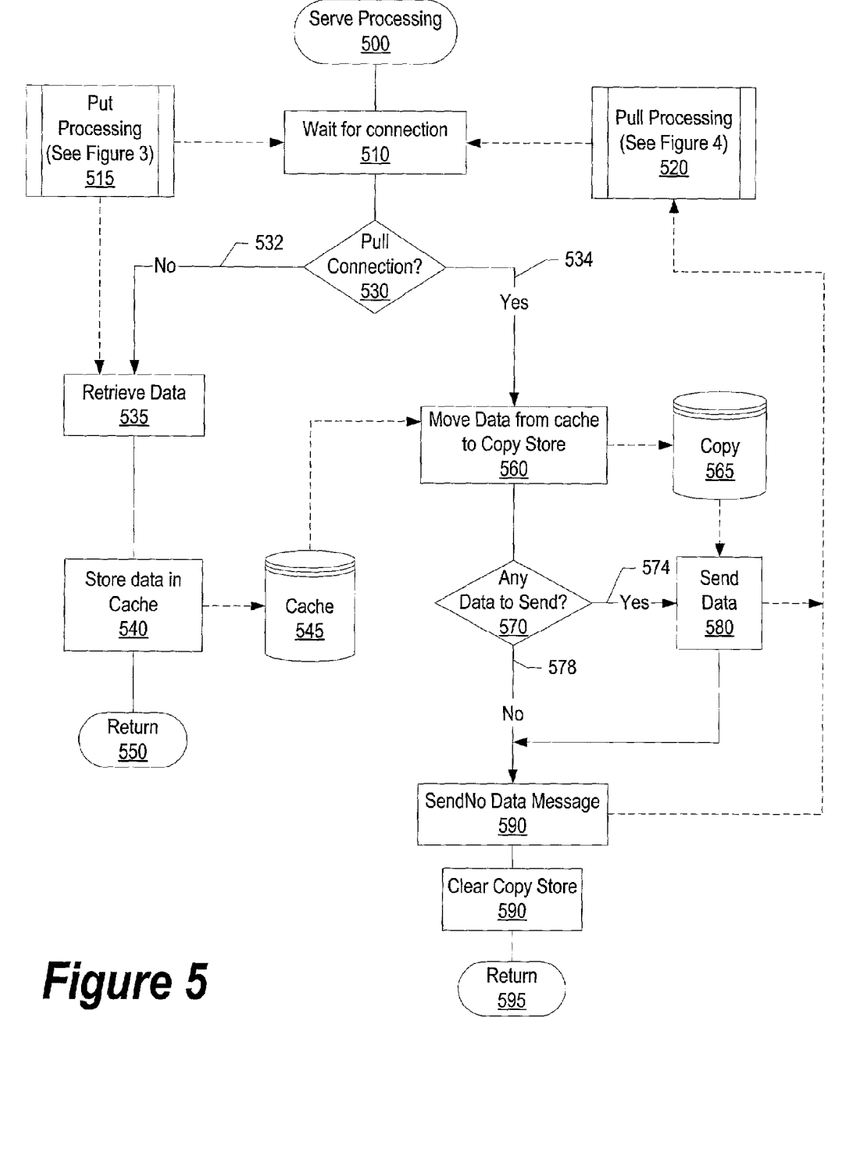
FIG. 5 is a flowchart showing pending requests being stored by a less secure computer system and retrieved by a more secure computer system in response to a query.

A separate thread initiates that establishes a connection at step 340 with serve data processing (pre-defined process block 350, see FIG. 5 for further details). A determination is made as to whether processing continues (decision 360). If processing continues, decision 360 branches to "Yes" branch 365 which loops back to process more requests or event data from endpoint 310. This looping continues until processing terminates, at which point decision 360 branches to "No" branch 370 and processing ends at 380.

FIG. 4 is a flowchart showing a more secure computer system processing pending requests from a less secure computer system. Processing commences at 400, whereupon configuration information is retrieved from secure configuration store 410 (step 405). Configuration information includes information which informs the system how often the more secure computer system should check for pending requests on the less secure computer system. Configuration information may also include network addresses of less secure computer systems which are monitored by the more secure computer system.

A timer is reset that tracks when the more secure computer system should check for requests on the less secure computer systems (step 415). A determination is made as to whether the timer has expired (decision 420). If the timer has not expired, decision 420 branches to "No" branch 422 which loops back repeatedly until the timer expires, at which point decision 420 branches to "Yes" branch 424.

Management region information is retrieved from secure configuration store 410 that informs the system which less secure computer systems to check for pending requests (step 425). A connection is established with the first management region (step 430) and serve data processing is initiated in the less secure computer system (pre-defined process block 435, see FIG. 5 for further details). Data is retrieved from less secure computer system at step 440.

The data is formatted and either sent to event console server 460 or a response is prepared and sent through firewall 450 to less secure computer system 455 (step 445). For example, if the pending request is an event that includes information about a malfunctioning server, the event data is sent to event console 460. However, if the pending request is a request for information from the more secure computer system, a response is sent through firewall 450 to less secure computer system 455. The response is sent by the less secure computer system back to the appropriate client that requested the information.

A determination is made as to whether there are more management regions (i.e. less secure computer systems) to check (decision 465). If there are more management regions to check, decision 465 branches to "Yes" branch 468 which loops back to increment to the next management region (step 470) and a connection is established with the next management region computer system. This looping continues until there are no more management regions to check, at which point decision 465 branches to "No" branch 466.

A determination is made as to whether processing continues (decision 475). If processing continues, decision 475 branches to "Yes" branch 480 which loops back to reset the timer and retrieve more data from the management regions. This looping continues until processing terminates, at which point decision 475 branches to "No" branch 485 and processing ends at 490.

FIG. 5 is a flowchart showing pending requests being stored and sent to a more secure computer system by the less secure computer system in response to a query. Serve processing commences at 500, whereupon processing waits for a connection request at step 510 from either put processing (pre-defined process block 515, see FIG. 3 for further details), or pull processing (pre-defined process block 520, see FIG. 4 for further details).

When a connection is established, a separate thread initiates to process the connection. A determination is made as to whether the connection is for put processing or pull processing (decision 530). If the connection is for put processing, decision 530 branches to "No" branch 532 whereupon data is received from put processing (step 535). The data may be a request for information from the more secure computer system or event information such as a malfunctioning server. The data is stored in cache 545 at step 540, and processing returns at 550.

On the other hand, if the connection is established for pull processing, decision 530 branches to "Yes" branch 534. Data is copied from cache 545 to copy store 565 (step 560). Data is copied to copy store 565 in order to avoid conflicts with put processing writing to cache 545 while pull processing simultaneously reads and removes items from cache 565.

A determination is made as to whether there is any data to send (decision 570). If there is not any data to send, a "no data" message is sent to pull processing (step 585) indicating that there is no data available for processing. The contents of copy store are cleared at step 590, and processing returns at 595. On the other hand, of there is data to send, data is sent to pull processing from copy 565 (step 580). The contents are then cleared from copy 565 at step 590, and processing returns at 595.

Figure 6:
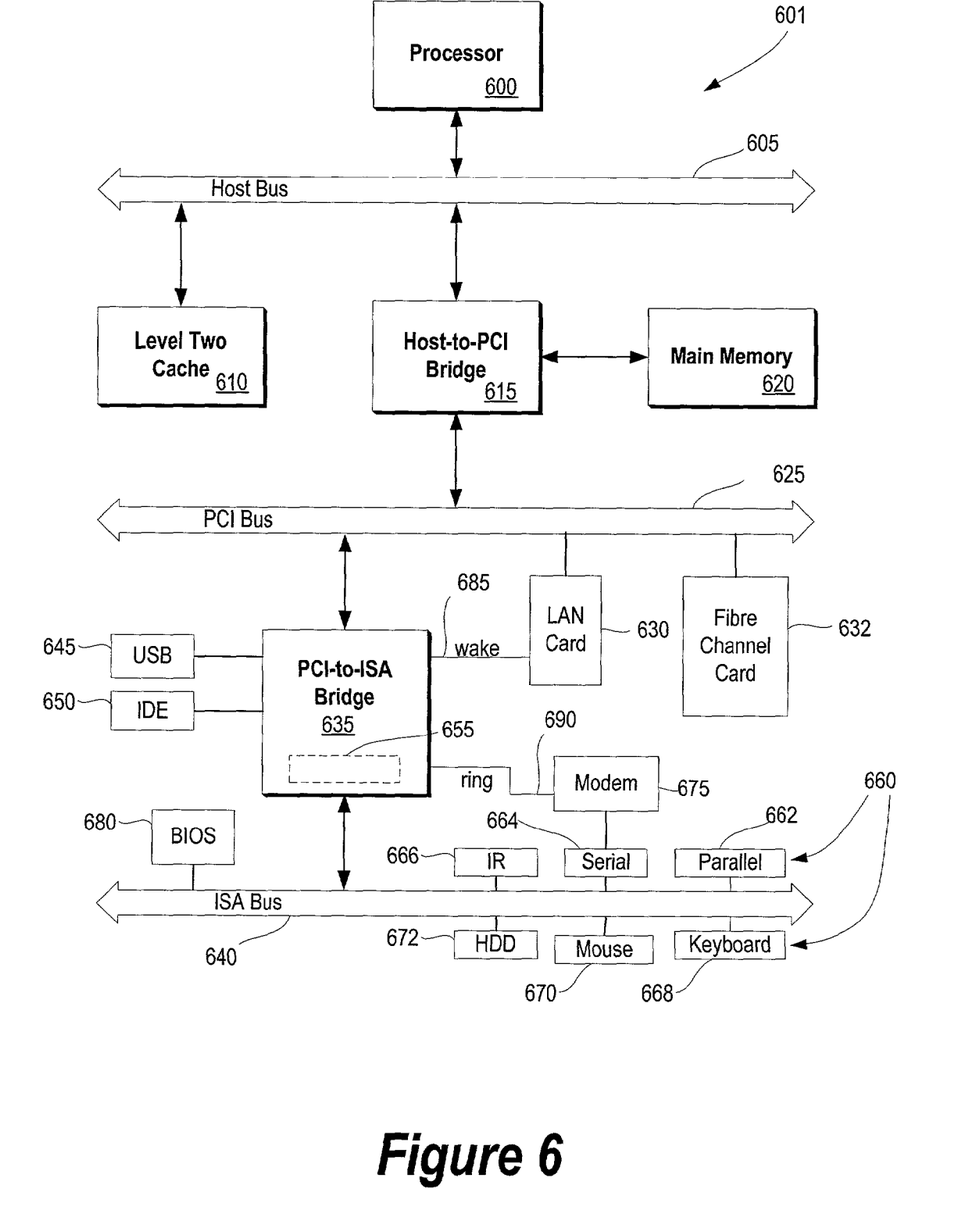
FIG. 6 is a block diagram of an information handling system capable of implementing the present invention.

FIG. 6 illustrates information handling system 601 which is a simplified example of a computer system capable of performing the server and client operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (HDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be recomputer systemnt in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for processing requests in a secure computer system, said method comprising:
    detecting that a timer has expired that corresponds to a more secure computer system checking for one or more pending requests on a less secure computer system;
    determining whether the pending requests are present on the less secure computer system in response to the detecting, the less secure computer system being connected to the more secure computer system in a computer network;
    transferring the pending requests from the less secure computer system to the more secure computer system in response to the determining;
    processing the transferred requests;
    determining whether the pending requests necessitates a reply; and
    providing the reply based upon determining whether the pending requests necessitate a reply.

2. The method as described in claim 1 wherein the reply is encrypted.

3. The method as described in claim 1 wherein the less secure computer system is adapted to:
    receive requests from one or more clients;
    store the received request in a first storage area forming the pending requests; and
    transfer the pending request in response to receiving a query from the more secure computer system.

4. The method as described in claim 3 further comprising:
    determining that there are no pending requests; and
    transferring a no data message in response to the determining.

5. The method as described in claim 3 further comprising:
    removing the pending requests from the first storage area in response to the transferring.

6. The method as described in claim 1 further comprising:
    identifying one of the pending requests that includes an event console request; and
    sending the event console request to an event console.

7. An information handling system comprising:
    one or more processors;
    a memory accessible by the processors;
    one or more nonvolatile storage devices accessible by the processors;
    a request processing tool to process pending requests, the request processing tool including:
        means for detecting that a timer has expired that corresponds to a more secure computer system checking for one or more pending requests on a less secure computer system;
        means for determining whether the pending requests are present on the less secure computer system in response to the detecting, the less secure computer system being connected to the more secure computer system in a computer network;
        means for transferring the pending requests from the less secure computer system to the more secure computer system in response to the determining;
        means for processing the transferred requests;
        means for determining whether the pending requests necessitates a reply; and
        means for providing the reply based upon determining whether the pending requests necessitate a reply.

8. The information handling system as described in claim 7 wherein the reply is encrypted.

9. The information handling system as described in claim 7 wherein the less secure computer system further comprises:
    means for receiving requests from one or more clients;
    means for storing the received request in a first storage area forming pending requests; and
    means for transferring the pending request in response to receiving a query from the more secure computer system.

10. The information handling system as described in claim 9 further comprising:
    means for determining that there are no pending requests; and
    means for transferring a no data message in response to the determining.

11. The information handling system as described in claim 7 further comprising:
    means for identifying one of the pending requests that includes an event console request; and
    means for sending the event console request to an event console.

12. A computer program product stored in a computer operable media for processing pending requests, said computer program product comprising:
    means for detecting that a timer has expired that corresponds to a more secure computer system checking for one or more pending requests on a less secure computer system;
    means for determining whether the pending requests are present on the less secure computer system in response to the detecting, the less secure computer system being connected to the more secure computer system in a computer network;
    means for transferring the pending requests from the less secure computer system to the more secure computer system in response to the determining;
    means for processing the transferred requests;
    means for determining whether the pending requests necessitates a reply; and
    means for providing the reply based upon determining whether the pending requests necessitate a reply.

13. The computer program product as described in claim 12 wherein the reply is encrypted.

14. The computer program product as described in claim 12 wherein the less secure computer system is adapted to:
    receive requests from one or more clients;

store the received request in a first storage area forming the pending requests; and transfer the pending request in response to receiving a query from the more secure computer system.

15. The computer program product as described in claim 14 further comprising:

means for determining that there are no pending requests; and means for transferring a no data message in response to the determining.

16. The computer program product as described in claim 14 further comprising:

means for removing the pending requests from the first storage area in response to the transferring.

17. The computer program product as described in claim 12 further comprising:

means for identifying one of the pending requests that includes an event console request; and means for sending the event console request to an event console.

18. A method for processing requests in a secure computer system, said method comprising:

detecting that a timer has expired that corresponds to a more secure computer system checking for one or more pending requests on a plurality of less secure computer systems, the plurality of less secure computer systems being connected to the more secure computer system in a computer network;

determining whether one or more of the pending requests are present on a first less secure computer system included in the plurality of less secure computer systems in response to the detecting;

transferring the pending requests that are present on the first less secure computer system to the more secure computer system in response to the determining;

processing the transferred pending requests;

providing a reply to the first less secure computer system in response to the processing;

determining whether one or more of the pending requests are present on a second less secure computer system included in the plurality of less secure computer systems;

identifying that none of the pending requests are present on the second less secure computer system; and transferring a no data message from the second less secure computer system to the more secure computer system in response to the identifying.

* * * * *